Feb. 20, 1934.  W. ECCLES  1,948,416
INERTIA GOVERNOR
Filed March 12, 1932  3 Sheets-Sheet 1

INVENTOR
William Eccles

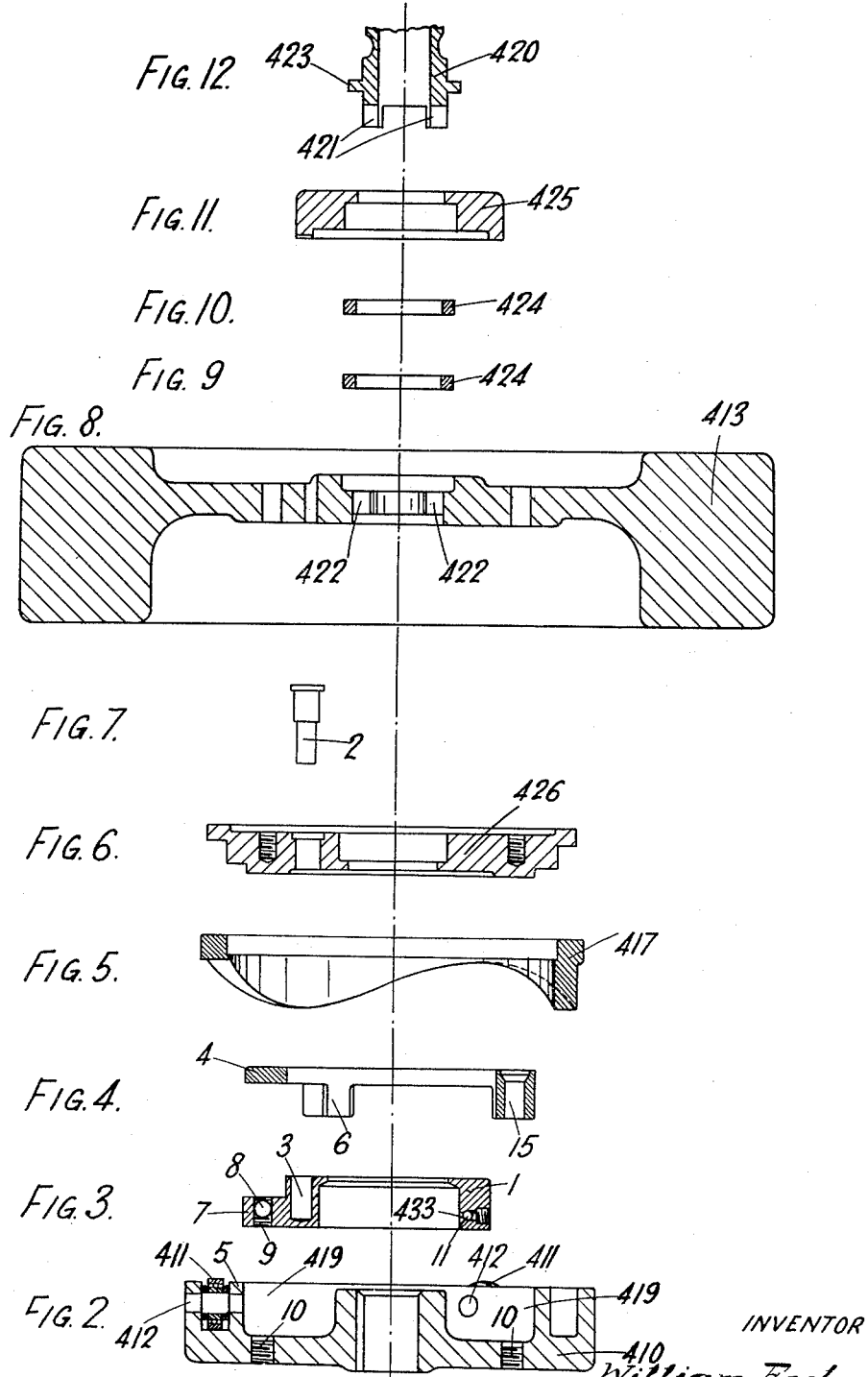

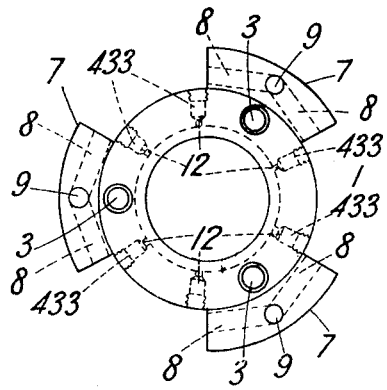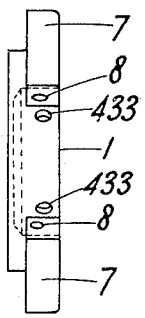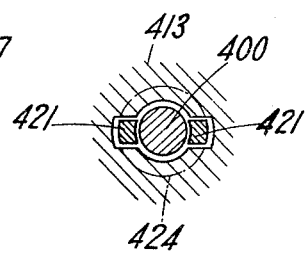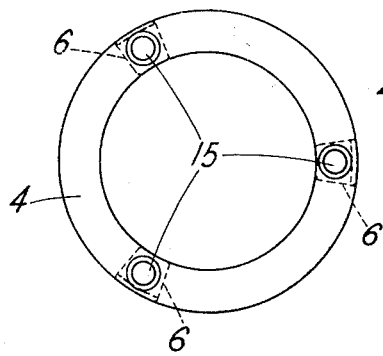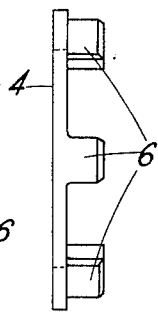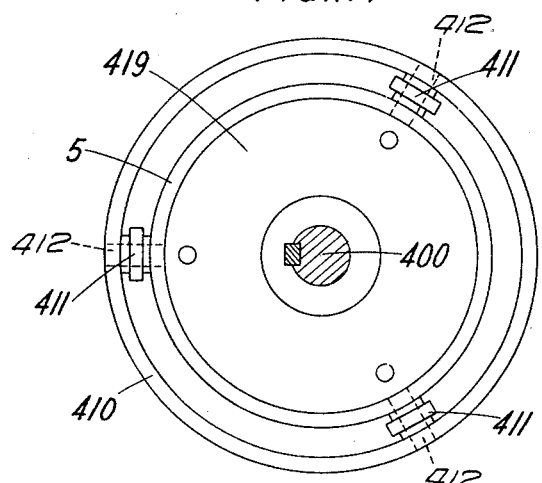

Patented Feb. 20, 1934

1,948,416

UNITED STATES PATENT OFFICE 1,948,416

INERTIA GOVERNOR

William Eccles, Chorlton-Cum-Hardy, England, assignor, by mesne assignments, to General Electric Company, a corporation of New York Application March 12, 1932, Serial No. 598,475, and in Great Britain March 17, 1931

2 Claims. (Cl. 264—11)

The invention relates to inertia governors of the type in which the governing action is caused, not by a mere change in speed, but in accordance with the rate of change of speed of the part to be governed, which type of governors may be termed acceleration or deceleration governors since they operate in accordance with changes in acceleration or deceleration of the part to be governed.

The invention particularly relates to governors of the kind which comprise a rotary member connected to the part, such as a winder drum, of which the deceleration or acceleration is to be registered and the rate of change of speed controlled so as to be rotated in accordance with the speed thereof, a freely rotatable inertia member, which is usually in the form of a fly-wheel and is driven by the rotated member through a resilient coupling, and a fourth or governing member which moves in accordance with the angular displacement between the fly-wheel or inertia member and the rotated member when a change in acceleration takes place. In the particular form of inertia governor to which the present invention relates the rotary member carries rollers which support a cam attached to the fly-wheel or inertia member so that the latter is free to rotate with respect to the rotated member when a difference occurs between the angular velocities of the rotary member and the fly-wheel.

The inertia governor may be applied with particular advantage to a brake for controlling a colliery winding gear, in which case the governor may be driven by the winding drum to control the application of the brakes thereto so that a predetermined deceleration can be obtained, the inertia governor controlling the valve of a brake engine either directly or through a pneumatic, hydraulic or other relay.

The invention provides an improved damping arrangement between the rotated member and the flywheel to prevent hunting of the brake gear mechanism of the winding or hoisting gear operated by the governor.

According to the invention, the rotated member is provided with an annular chamber in which is disposed a circular member rotatable with the flywheel but constrained against axial movement therewith, and having radial projections which are located in radial recesses in the annular chamber defined by abutments therein. The recesses are larger than the radial projections so that clearance permitting rotation of the circular member relative to the rotated member is provided in both directions. The recesses are filled with a suitable liquid, and passageways are provided between adjacent recesses in the rotated member or between the two sides of each projection on the circular member constituting with slight clearances between the relatively rotatable members the only conduits for the passage of liquid.

The cross-sectional areas of the passageways for the liquid are preferably adjustable in cross section, whereby any desired degree of damping may be obtained.

The annular chamber may advantageously be formed by an upstanding rim on the rotated member and an annular ring which is fitted therein forming an inwardly projecting flange, and the radial projections on the circular member may extend outwardly from the periphery thereof into the corresponding recesses in the annular chamber which are formed by abutments extending radially inwardly from the rim.

A preferred arrangement of the invention is illustrated by way of example in the accompanying drawings, in which:—

Figures 2 to 12 are separate axial sectional views of the several elements which are shown in assembled relation in Fig. 1.

Fig. 13 is a plan view of the damping ring,

Fig. 14 is an elevation of the damping ring,

Fig. 15 is a plan view of the annular ring with which the damping ring shown in Figs. 13 and 14 is associated, Fig. 16 is an elevation of the annular ring shown in Figs. 4 and 15, Fig. 17 is a plan view of the rotatable member shown in axial section in Fig. 2, and Fig. 18 is a cross section on the line A—A, Fig. 1, showing the connection between the flywheel member and the sleeve actuated thereby.

Figure 1:
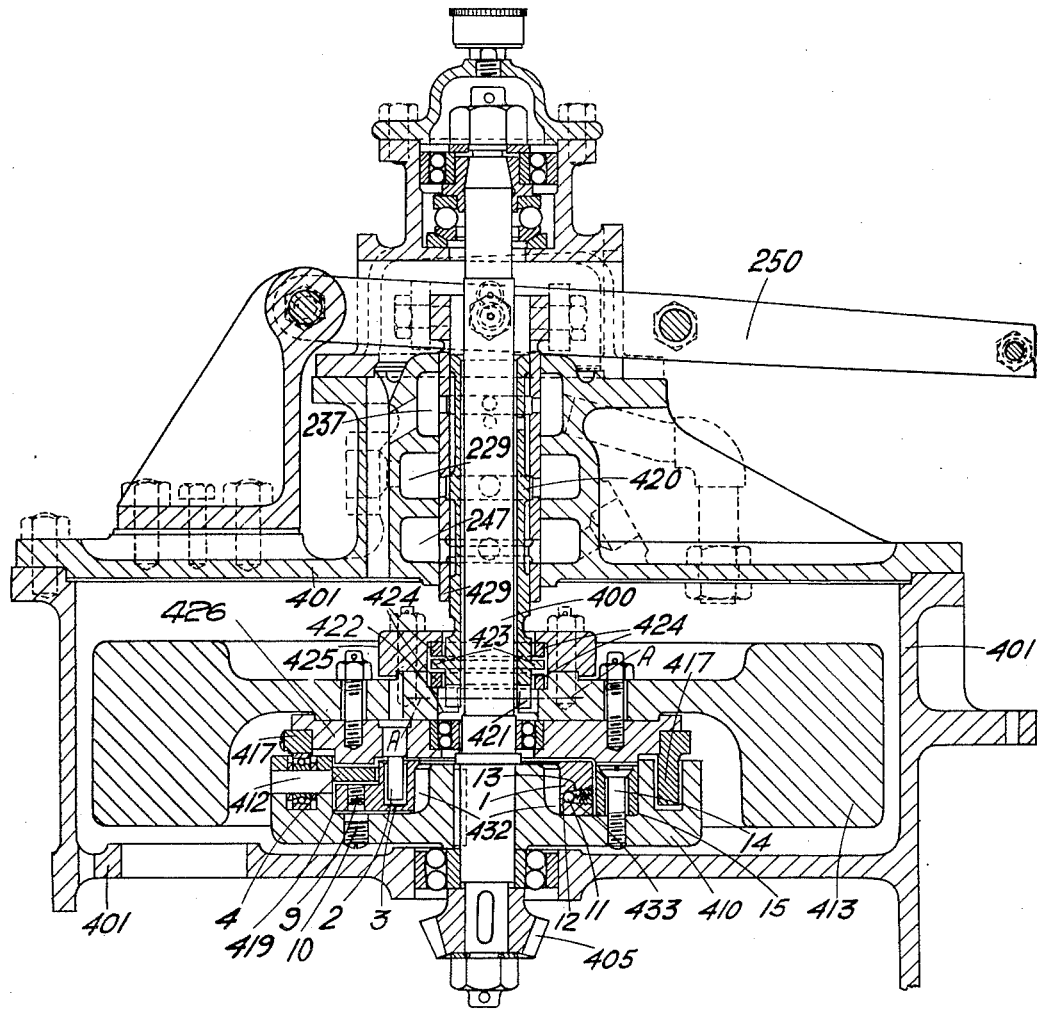
Fig. 1 is a cross-sectional elevation through an inertia governor intended for use in preventing the excessive application of braking force to a winding or hoisting gear, which governor embodies the improved damping arrangement according to the present invention.

Referring to the drawings, a vertical shaft 400 (Fig. 1), mounted for rotation in anti-friction bearings in a suitable casing 401, is driven, through the bevel gear wheel 405 carried thereby, from the winding engine or other apparatus to be governed in accordance with the speed of the latter. A rotated member 410, shown in detail in Figs. 2 and 17, is keyed to the lower portion of the shaft 400 and carries on its periphery three anti-friction rollers 411 mounted for rotation on radially disposed horizontal shafts 412 spaced equally around the periphery of the member 410.

A fly-wheel inertia member 413 (shown in Fig. 8), located co-axially with the shaft 400 immediately above the driven member 410, has bolted to its under side a circular cam disc 417 (Fig. 5) having three cam profiles, each resting respectively on one of the rollers 411.

The governor member comprises a sleeve 420 (Fig. 12) surrounding the shaft 400 with a suitable clearance of, say, a 100th of an inch, and having at its lower end two or more claws or projections 421 (see also Fig. 18) which fit freely into corresponding slots 422 (Fig. 8) in the fly-wheel 413 so that the sleeve 420 will be rotated with the fly-wheel 413. The sleeve 420 is provided, adjacent its lower end, with a flange 423, on either side of which is located a ring or washer 424 (Figs. 9 and 10). Said rings or washers 424 are secured between the upper face of the fly-wheel 413 and a retaining ring 425 (Fig. 11) fixed thereto. Such arrangement of washers 424 and flange 423 causes the sleeve 420 to follow the vertical movement of the fly-wheel 413 without following any tilting movement thereof. It will be appreciated that the rotation of the sleeve 420 increases the sensitivity of operation by preventing static friction.

A ported sleeve 429 surrounds the sleeve 420 and cooperates with appropriate ports 237, 229 and 247 of the casing 401. Said ported sleeve 429 is adapted to be moved through a suitable lever 250 by the power piston of the relay controlled by the governor so that the sleeve 429 follows the sleeve 420, the arrangement being generally similar to that employed in turbine governor gear.

A detached ring 1 (Figs. 3, 13 and 14), separate from the members 413 and 410, rotates with the fly-wheel 413 by means of vertical driving pins 2 (Fig. 7) secured in an annular member 426 (Fig. 6) which is secured to the end side of the fly-wheel and engaging vertical holes 3 provided in the ring. This ring 1, which will hereinafter be termed the "damping member", is constrained against following the vertical movement of the fly-wheel 413 by means of an annular ring 4, shown in plan in Fig. 15, shown in section in Fig. 4 and in elevation in Fig. 16. The annular ring 4, has a press fit in the inner periphery of an annular channel 419 formed on the upper face of the rotated member 410 and adapted to contain damping liquid. The ring 4 is disposed at the upper edge of this channel, defining with the upper face of the rotated member 410 and the upstanding flange 5 an outer annular channel. The inner periphery of the annular ring 4 has a sliding fit with the outer periphery of the ring 1 having a clearance of the order of .0015 of an inch, whereby any substantial leakage of fluid between said rings is prevented. The annular ring 4 is additionally secured to the member 410 by means of screws 14 passing through holes 15 in the ring and is provided with three depending abutments 6 equally spaced around the ring to divide the annular channel 419 into three recesses adapted to contain oil or other suitable damping liquid. The damping member 1 is provided with three radial projections or vanes 7 which extend into the three recesses in the annular channel with clearances for relative motion to a small extent in both the clockwise and anticlockwise directions. The projections 7 are provided with passages 8 which establish communications between opposite faces of each projection, thus allowing the damping liquid in each recess to pass from one side of each projection 7 to the other side thereof when relative angular movement occurs between the damping member 1 and the member 412. The passages 8, through which the liquid displacement mainly occurs, may be obturated to a greater or less extent by means of regulating screws 9 which intersect the passages 8 and are so disposed in the projections 7 as to align, when in their normal positions, with plugs 10 screwed into openings in the rotated member 410 so that, by removing the plugs 10, the regulating screws 9 are readily accessible for adjusting the passageways 8 without the necessity of dismantling the whole device. A certain small amount of oil also passes, by way of the clearances between the arcuate outer faces of the projections 7 and the flange 5 of the rotated member 410 from one side of each projection 7 to the other and between adjacent recesses during relative movement of the rotated member 410 and the fly-wheel 413 and its associated damping member 1. These clearances, which may be of the order of 1/64th of an inch provide an unvarying resistance to the oil flow which is unaffected by any regulation of the passageways 8, and they ensure furthermore that a passageway is always provided for the oil so that the rotated member 410 and the damping member 1 cannot become locked together when the passageways 8 are completely obturated by the adjusting screws 9.

The damping liquid in an inner annular channel 432, formed between the inner periphery of the damping member 1 and the boss of the rotated member 410, flows into the recesses in the outer annular channel 419 by way of radial bores or ducts 433 in the damping member 1 which are fitted with non-return valves comprising spring loaded balls 11 which seat on valve faces 12 formed in the ducts 433, whereby the recesses in the outer annular channel are maintained full of damping liquid, the centrifugal force assisting to force the oil into the recesses against the resilience of springs 13 when the device rotates.

The operation of the governor is as follows. When the shaft 400 is at rest or rotates at a steady speed, the fly-wheel 413, on account of its weight, will assume its lowest position upon the rollers 411. When the shaft 400 accelerates or decelerates, angular movement will be caused between the fly-wheel 413 and the rotary member 410 until a position of equilibrium is reached at which the reactions between the rollers 411 and the cams 417 counterbalance the weight of the fly-wheel and the torque necessary to accelerate it to the same rate as the shaft, such position corresponding to a definite value of acceleration or deceleration. From such position the fly-wheel is caused by the cams 417 to rise or fall according to the increase or decrease of acceleration or deceleration and the profile of the cam.

During increase in acceleration or deceleration the fly-wheel raises the sleeve 420 to actuate the means for controlling the braking mechanism, which means, as before stated, may be the valves of a hydraulically or pneumatically actuated mechanism.

It will be evident that the construction, arrangement and operation of the device may be modified within the scope of the invention which provides a damping device for an inertia governor which is relatively simple, reliable and readily adjustable as regards the damping effect which may be obtained.

I claim:—

1. In an inertia governor comprising a member mounted for rotation about a fixed vertical axis by apparatus to be governed in accordance with the speed thereof and having an upstanding rim defining an annular chamber for damping liquid, a ring member fitting in said rim and having a flange projecting inwardly from the upper end of said rim and abutments depending into said annular chamber, a fly-wheel member coaxially surrounding said rotatable member and freely rotatable with respect thereto but constrained within predetermined limits of rotation relative to the rotatable member to move axially relatively to the latter in opposition to gravity when a change occurs in the angular velocity of the rotatable member, a valve operable by the axial movement of said fly-wheel member for controlling the supply of operative fluid to a brake engine acting upon the apparatus to be governed, damping means between said rotatable member and said fly-wheel member, said damping means comprising an annular member disposed in the annular chamber in the rotary member and rotatable with the fly-wheel but constrained against axial movement therewith, said annular member having radial projections located in the annular chamber between the abutments of the ring member with their ends spaced slightly from the circumference of said annular chamber to afford clearance for rotation of the annular member relatively to the rotatable member in either direction, said radial projections each having a passageway therethrough constituting with the radial clearance between said annular and rotatable members the only conduits for the passage of damping liquid from the spaces on one side of said radial projections to the spaces on the other side of said radial projections, and means including screw plugs extending transversely of said passageways for adjusting the cross-sectional areas of said passageways.

2. Damping means for an inertia governor according to claim 1, including a central boss on the rotatable member spaced from the inner periphery of the annular member and forming with the latter a reservoir chamber, and non-return valves radially disposed in the annular member for the passage of damping liquid from said reservoir chamber to the annular chamber.

WILLIAM ECCLES.